F. C. DAMM.
DRIVE FOR LINOTYPE MACHINES.
APPLICATION FILED NOV. 8, 1913.
1,193,669.
Patented Aug. 8, 1916.
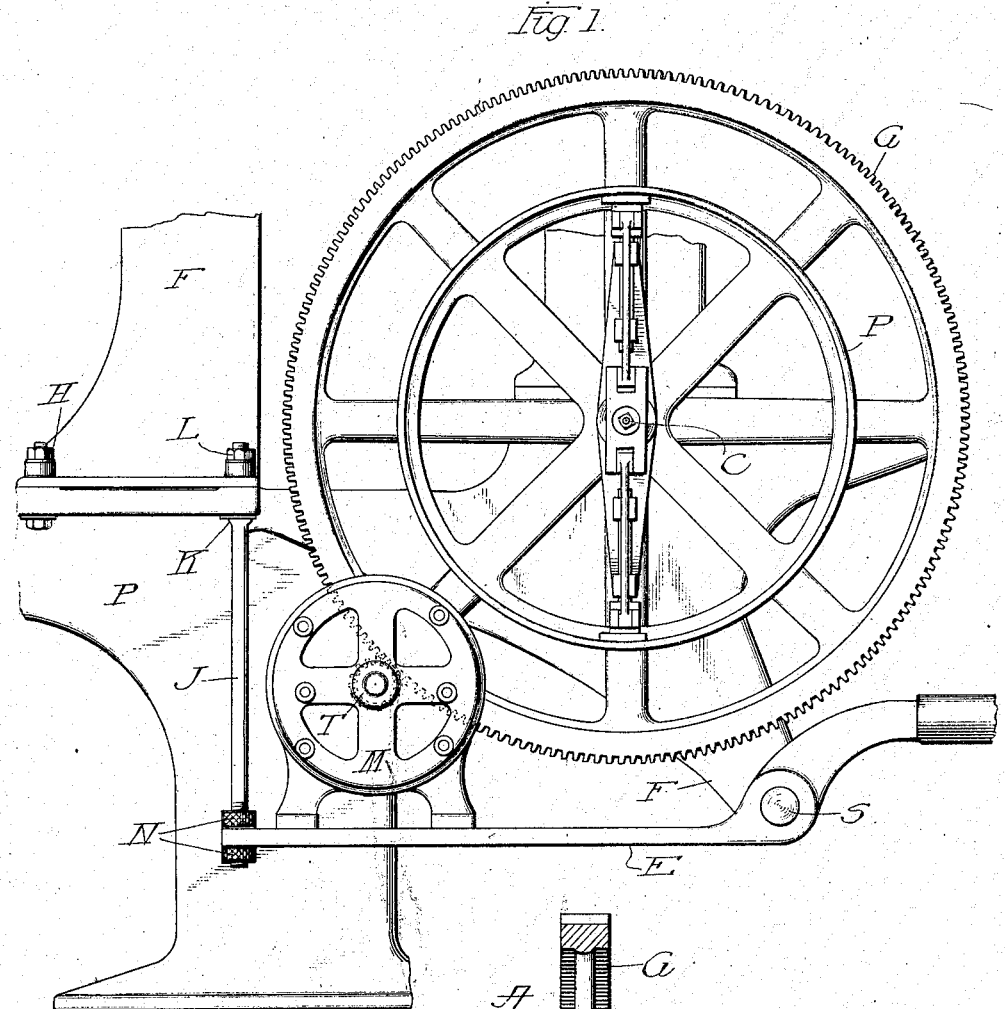
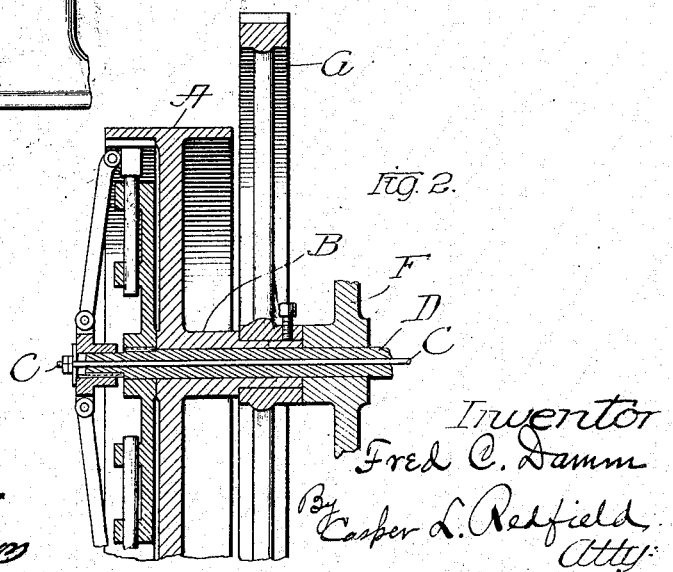

UNITED STATES PATENT OFFICE.

FRED C. DAMM, OF CHICAGO, ILLINOIS.

DRIVE FOR LINOTYPE-MACHINES.

1,193,669.

Specification of Letters Patent.

Patented Aug. 8, 1916.

Application filed November 8, 1913. Serial No. 799,903.

*To all whom it may concern:*

Be it known that I, FRED C. DAMM, a citizen of the United States of America, and a resident of Chicago, county of Cook and State of Illinois, have invented certain new and useful Improvements in Drives for Linotype-Machines, of which the following is a specification.

My invention relates to motor drives for linotypes and has for its object improvements in such devices.

Linotype machines have been operated for some time by gear connections from an electric motor, but owing to the high speed of the motors the gears wear rapidly and soon become noisy unless there is some means for adjusting such gears to each other. The adjustment which I have devised for overcoming this difficulty is designed to be applied to the existing machines without alteration, and is adapted to small variations of adjustment.

In the accompanying drawings Figure 1 is an elevation showing a portion of the frame and pedestal of a linotype; and Fig. 2 is a longitudinal section of one end of the drive shaft and parts supported thereon.

In the said drawings, F is a portion of the frame, and P a portion of the pedestal of a linotype machine. At the back of the machine is a drive shaft D, on which is a clutch pulley A having a hub B. A rod C serves to connect the pulley to the shaft D, and on the hub B is a large gear G.

Supported in the frame F below the drive shaft D, and slightly to the rear, is a shaft S which belongs to the machine and operates part of the mechanism thereof. On the projecting end of the shaft S I pivot a motor carrying platform E in a substantially horizontal position beneath the gear G.

In linotype machines as constructed, the frame F is secured to the pedestal P by bolts H. I remove one of these bolts and substitute therefor a rod J having a collar K and a nut L serving the same purpose as the original bolt. Below the collar K, the rod J projects through a hole in the free end of the platform E, and is provided with nuts N for adjusting the platform on its pivot S.

The motor M is mounted upon this platform and is provided with a pinion T for engaging the gear G.

It will be observed by the construction shown that by slacking the upper nut N and adjusting the lower one, the platform will be turned on its pivot S to move the pinion T nearer to or farther from the gear G. Also, that the screw adjustment involved may be made while the motor is in operation so that the effect of the adjustment may be determined by the sound of the gears working together. When the proper adjustment is obtained the upper nut N may be screwed down on the rod J and thus become a lock nut to hold the adjustment.

What I claim is:

1. The combination with the drive shaft and frame of a linotype machine, of a gear mounted upon the drive shaft, a platform pivoted upon the frame, a motor secured to the platform, a pinion driven by the motor, and a screw adjustment for turning the platform on its pivot so as to adjust the pinion with respect to the gear.

2. The combination with the frame and the drive shaft of a linotype machine, of a motor pivotally supported on the frame, a pinion driven by the motor, a gear on the drive shaft engaged by the pinion, and a rod supported from the frame and provided with a screw adjustment for turning the motor on its pivot so as to adjust the pinion with respect to the gear.

3. The combination with the frame and the drive shaft of a linotype machine, of a motor, connections from the motor to the shaft for driving the latter, a bolt for securing the frame in place, said bolt having an extending portion, and a screw adjustment on the extended part of the bolt for adjusting the motor with respect to the shaft.

Signed at Chicago, Illinois, this 6th day of November, 1913.

FRED C. DAMM.

Witnesses:
C. L. REDFIELD,
WALTER H. REDFIELD.